US012625336B2

(12) United States Patent
Lee et al.

(10) Patent No.: US 12,625,336 B2
(45) Date of Patent: May 12, 2026

(54) MULTI-CASSETTE FIBER DISTRIBUTION FRAME

(71) Applicant: S-MODUL INC., Gyeyang-gu (KR)

(72) Inventors: Min Oh Lee, Gyeyang-gu (KR);
Pyoung Gu Kim, Gyeyang-gu (KR)

(73) Assignee: S-MODUL INC., Gyeyang-gu (KR)

( * ) Notice: Subject to any disclaimer, the term of this patent is extended or adjusted under 35 U.S.C. 154(b) by 295 days.

(21) Appl. No.: 18/460,426

(22) Filed: Sep. 1, 2023

(65) Prior Publication Data

US 2024/0094495 A1     Mar. 21, 2024

(30) Foreign Application Priority Data

Sep. 15, 2022     (KR) ........................ 10-2022-0116217

(51) Int. Cl.
G02B 6/00          (2006.01)
G02B 6/44          (2006.01)

(52) U.S. Cl.
CPC ....... G02B 6/44524 (2023.05); G02B 6/4453 (2013.01)

(58) Field of Classification Search
CPC .............. G02B 6/44524; G02B 6/4453; G02B 6/4455; G02B 6/4452
See application file for complete search history.

(56) References Cited

U.S. PATENT DOCUMENTS

| | | | | |
|---|---|---|---|---|
| 6,535,682 | B1 * | 3/2003 | Puetz ................. | G02B 6/44528 385/137 |
| 8,712,206 | B2 * | 4/2014 | Cooke ................. | G02B 6/4452 385/134 |

| | | | | |
|---|---|---|---|---|
| 9,723,756 | B1 | 8/2017 | Masters et al. | |
| 2014/0248028 | A1 | 9/2014 | Campbell et al. | |
| 2015/0071597 | A1 * | 3/2015 | Beamon ............... | G02B 6/4453 385/135 |
| 2018/0259736 | A1 | 9/2018 | Hsu | |
| 2021/0084788 | A1 | 3/2021 | Smith et al. | |

FOREIGN PATENT DOCUMENTS

| | | |
|---|---|---|
| JP | 2012527653 A | 11/2012 |
| KR | 20030066080 A | 8/2003 |
| KR | 20150114990 A | 10/2015 |
| KR | 20160123772 A | 10/2016 |
| KR | 102492328 B1 | 1/2023 |

OTHER PUBLICATIONS

International Search Report issued for PCT/KR2023/010007, dated Oct. 12, 2023.
Extended European Search Report for EP 23191090.2, dated Jan. 4, 2024.

* cited by examiner

*Primary Examiner* — Jennifer Doan
(74) *Attorney, Agent, or Firm* — Mark T. Vogelbacker; Eckert Seamans Cherin & Mellott, LLC

(57)          ABSTRACT

A multi-cassette fiber distribution frame for easily withdrawing a desired cassette from a stacked structure of a plurality of cassettes can include a frame whose front surface is open, a plurality of holders provided on the frame at intervals, a plurality of slots formed by the intervals and each including an inlet and an outlet facing the front surface of the frame, and pop-up parts provided on the plurality of holders and configured to be elastically restored toward the inlet and outlet.

6 Claims, 13 Drawing Sheets

100

150

162

150

167

165

MULTI-CASSETTE FIBER DISTRIBUTION FRAME

CROSS-REFERENCE TO RELATED APPLICATION

This application claims priority to and the benefit of Korean Patent Application No. 2022-0116217, filed on Sep. 15, 2022, the disclosure of which is incorporated herein by reference in its entirety.

BACKGROUND

1. Field of the Invention

The present invention relates to a multi-cassette fiber distribution frame, and more particularly, to a multi-cassette fiber distribution frame that is improved in terms of the convenience in replacing and dissembling/assembling cassettes.

2. Discussion of Related Art

In general, as the development of an ultra-high-speed information communication network has accelerated, the types of advanced information communication services have become diverse. Accordingly, an optical distribution device configured to manage and provide an optical cable in a state in which a plurality of optical cables are installed is installed in communication rooms of various buildings or apartments, including a telephone station, to provide Fiber-to-the-Home (FTTH) services.

In such an optical distribution device, a stacked structure of a plurality of fiber distribution frames is installed in a rack cabinet, and a plurality of cassettes with a plurality of optical cable connection terminals are inserted and installed in each of the fiber distribution frames.

Here, because the size of the rack cabinet is determined according to an international standard, fiber distribution frames are required to be compact for connection of as many optical cables as possible to the rack cabinet of the determined size and are required to be configured to install as many cassettes as possible therein.

To reflect these requirements, there are many environments in which cassettes are densely installed with little clearance in a multi-cassette fiber distribution frame in which a plurality of cassettes are installed.

However, when cassettes are densely installed without clearance, it is difficult to secure sufficient space for a worker to grip a cassette with his or her hand to replace the cassette with another or dissemble or assemble cassettes, thus causing inconvenience in replacing or dissembling/assembling cassettes.

In particular, it is very difficult to withdraw an intermediate cassette from a stacked structure of a plurality of cassettes.

SUMMARY OF THE INVENTION

To address at least some of the above-described problems of the related art, the present invention is directed to providing a multi-cassette fiber distribution frame for easily withdrawing a desired cassette from a stacked structure of a plurality of cassettes.

The multi-cassette fiber distribution frame includes a frame whose front surface is open, a plurality of holders provided on the frame at intervals, a plurality of slots formed by the intervals and each including an inlet and an outlet facing the front surface of the frame, and pop-up parts provided on the plurality of holders and configured to be elastically restored toward the inlet and outlet.

In an embodiment, the pop-up parts may each include a push shaft configured to move forward and backward on a rear end of one of the plurality of holders, and an elastic member provided on one of the plurality of holders and configured to apply elastic pressure to the push shaft toward the inlet and outlet.

In an embodiment, the multi-cassette fiber distribution frame may further include cassettes including a plurality of optical cable connection terminals on front surfaces thereof and configured to be inserted into the plurality of slots. The pop-up parts may apply elastic pressure on the cassettes inserted into the plurality of slots toward the inlet and outlet. The multi-cassette fiber distribution frame may further include suppressors provided on the cassettes and the plurality of holders and configured to resist elastic pressure applied by the pop-up parts to suppress movement of the cassettes inserted into the plurality of slots.

The suppressors may each include a bolt hole formed in a front surface of one of the plurality of holders, and a screw provided on a front end of one of the cassettes and coupled to the bolt hole through a bolt.

In another embodiment, the suppressors may each include a stopping groove formed in one of the plurality of holders, and a lever provided on one of the cassettes and provided with a bump to be caught in the stopping groove, wherein a portion of the lever extends from the front surface of the cassette.

In another embodiment, the lever may be detachably assembled to the cassette.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The terms used herein are only used to describe certain embodiments and are not intended to limit the present invention. As used herein, the singular expressions are intended to include plural forms as well, unless the context clearly dictates otherwise.

Hereinafter, embodiments of the present invention will be described in detail with reference to the accompanying drawings.

A multi-cassette fiber distribution frame 100 according to an embodiment of the present invention will be described with reference to FIGS. 1 to 9.

Figure 1:
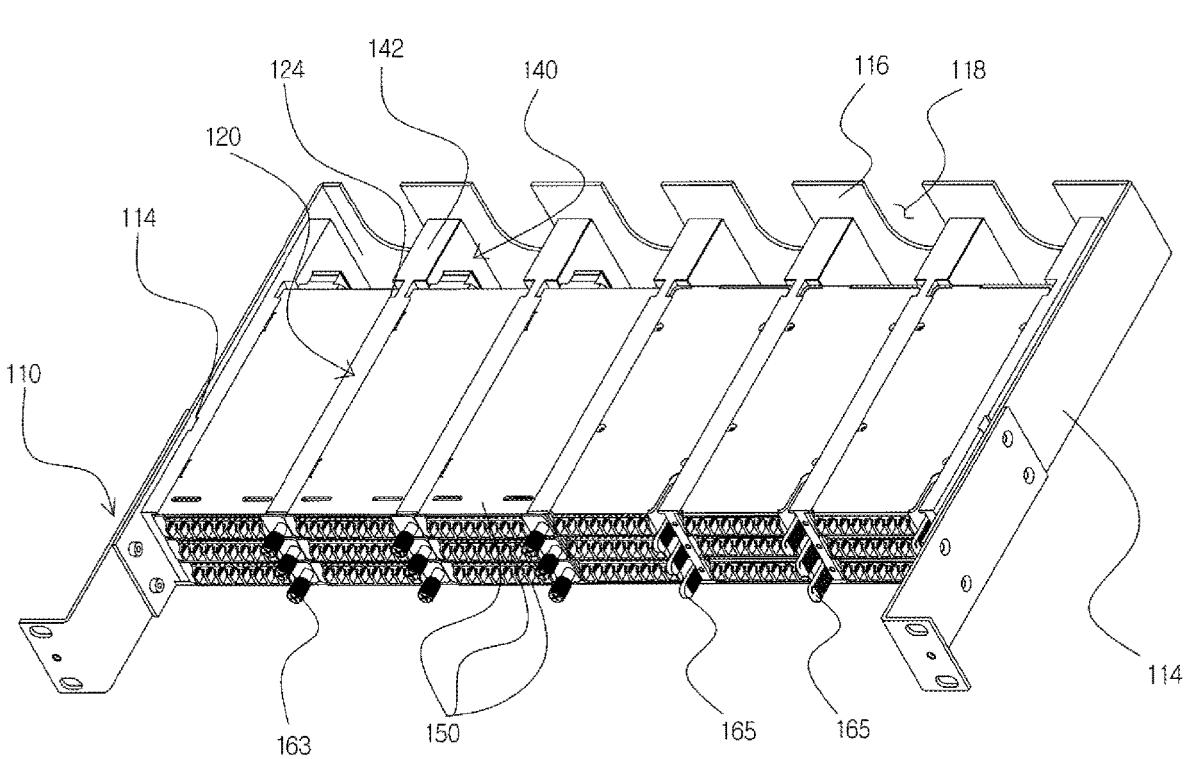
FIG. 1 is a perspective view of a multi-cassette fiber distribution frame according to an embodiment of the present invention.
Figure 2:
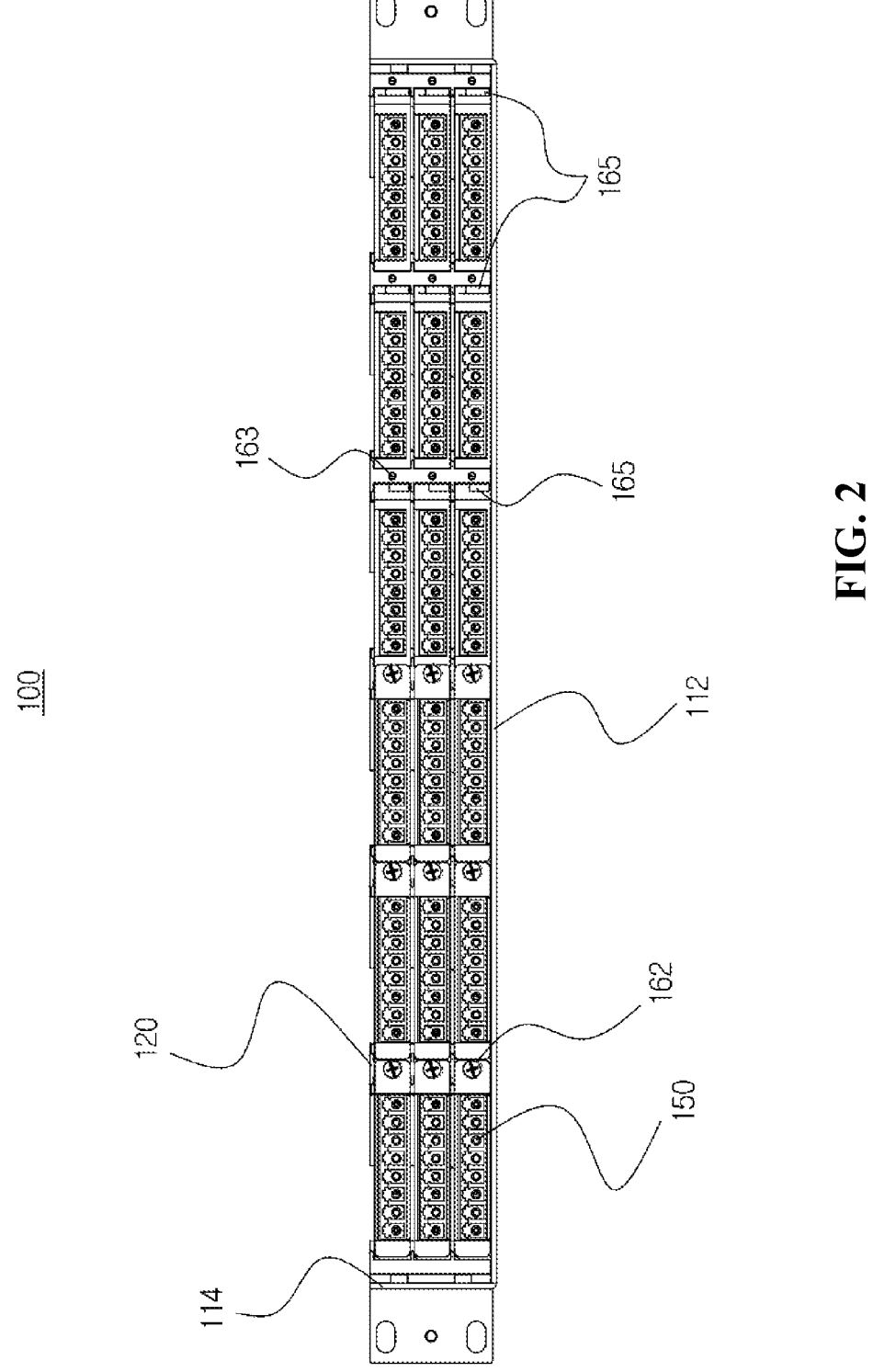
FIG. 2 is a front view of the multi-cassette fiber distribution frame of FIG. 1.
Figure 3:
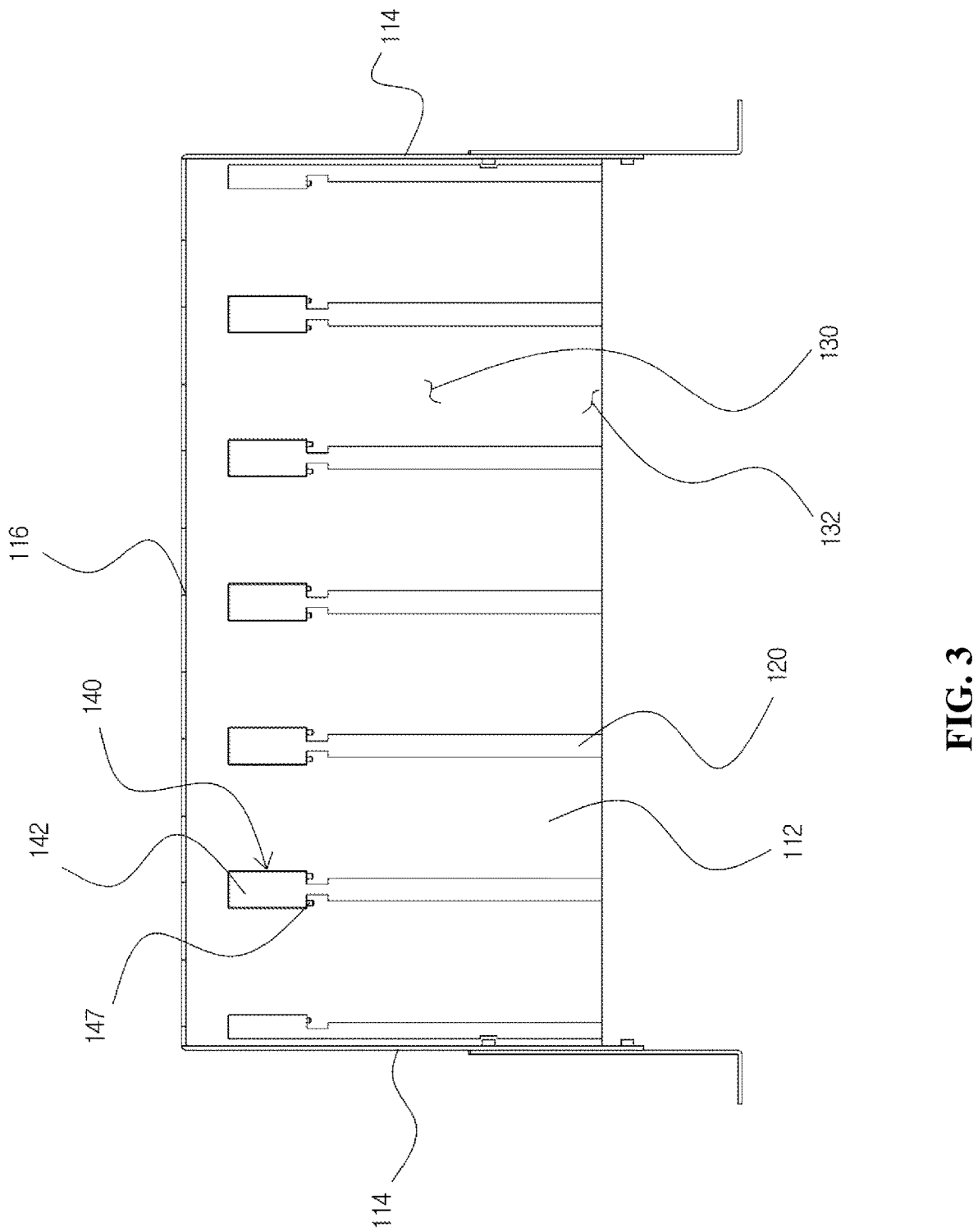
FIG. 3 is a plan view of an assembly in which a frame and a holder included in the multi-cassette fiber distribution frame of FIG. 1 are assembled.
Figure 4:
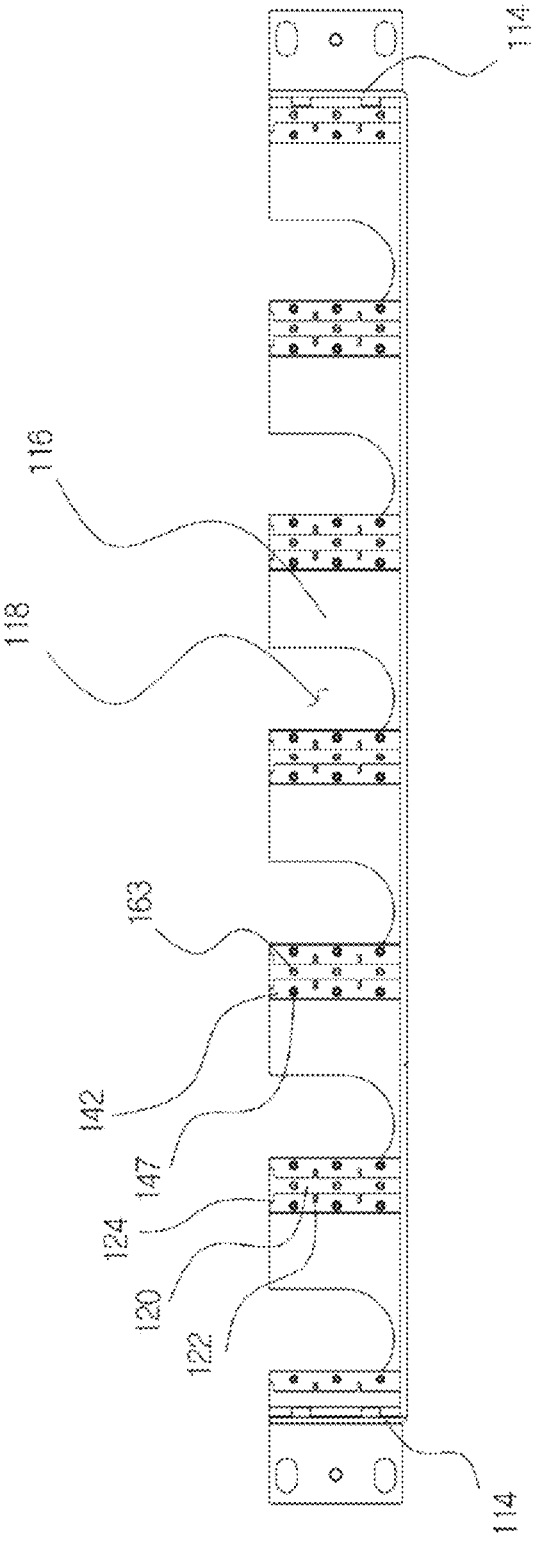
FIG. 4 is a front view of the assembly of FIG. 3.

Here, FIGS. 1 and 2 are a perspective view and a front view of a multi-cassette fiber distribution frame 100 according to an embodiment of the present invention. FIGS. 3 and 4 are a plan view and a front view of an assembly in which a frame 110 and a holder 120 are assembled. FIGS. 5 to 8 are a perspective view, a projected perspective view, a plan view, and a left side view of the holder 120. FIG. 9 is a cross-sectional view illustrating another example of the holder 120.

First, as shown in FIGS. 1 and 2, the multi-cassette fiber distribution frame 100 according to an embodiment of the present invention may include a frame 110, the holder 120, a slot 130, a pop-up part 140, cassettes 150, and a suppressor 160.

The frame 110 is a structure on which a plurality of cassettes 150 are mounted, and may function as a shelf for arranging the plurality of cassettes 150 in a cabinet in which a fiber distribution frame is installed, when coupled to the cabinet.

As shown in FIGS. 3 and 4, in an embodiment, the frame 110 may include a base plate 112 having an open front surface and forming a bottom, sidewalls 114 extending upward from both ends of the base plate 112, and a rear cover 116 extending upward from a rear end of the base plate 112.

A connector hole 118 into which a multi-optical cable push-on (MPO) connector connected to the plurality of cassettes 150 is inserted may be formed in the rear cover 116.

In an embodiment, a plurality of connector holes 118 may be formed in a horizontal direction to each correspond to one of an array of cassettes 150 in the horizontal direction, or one connector hole 118 may be formed in a vertical direction to correspond to an array of cassettes 150 stacked in the vertical direction, but embodiments are not limited thereto and the positions and number of connector holes 118 may be changed variously.

In an embodiment, the sidewalls 114 and the rear cover 116 of the frame 110 may be integrally formed using a steel sheet by sheet metal working but are not limited thereto and may be assembled together.

As shown in FIGS. 3 and 4, a plurality of holders 120 are provided on the base plate 112 of the frame 110 at intervals in a horizontal direction to support the cassettes 150.

As shown in FIGS. 5 to 8, in an embodiment, the holder 120 may be in the form of a plate extending from the front surface of the frame 110 to the rear surface thereof, and include a guide rail 122 that protrudes from a surface of the holder 120 facing another holder 120 and extends from the front surface of the frame 110 to the rear surface thereof.

Here, the guide rail 122 supports bottom surfaces of the cassettes 150 and thus a height at which the cassettes 150 are to be installed may be determined by a position of the guide rail 122.

In one embodiment, a plurality of guide rails 122 may be provided in parallel on the holder 120 in the vertical direction. Through the above structure, the plurality of cassettes 150 to be inserted into slots 130, which are formed between the holders 120 as will be described below, may be individually supported by the guide rails 122 to be independently inserted into or separated from the slots 130.

As shown in FIGS. 3 and 4, the guide rail 122 is provided only on one surface of each of the holders 120 located at both ends to be in contact with the sidewalls 114 of the frame 110, and is provided on both surfaces of the holder 10 located on a middle region of the frame 110.

The guide rails 122 extend lengthwise in a longitudinal direction of the holders 120 to not only support the cassettes 150 but also reinforce the rigidity of the holders 120 of a plate shape, thereby preventing the warpage of the holders 120.

Figure 5:
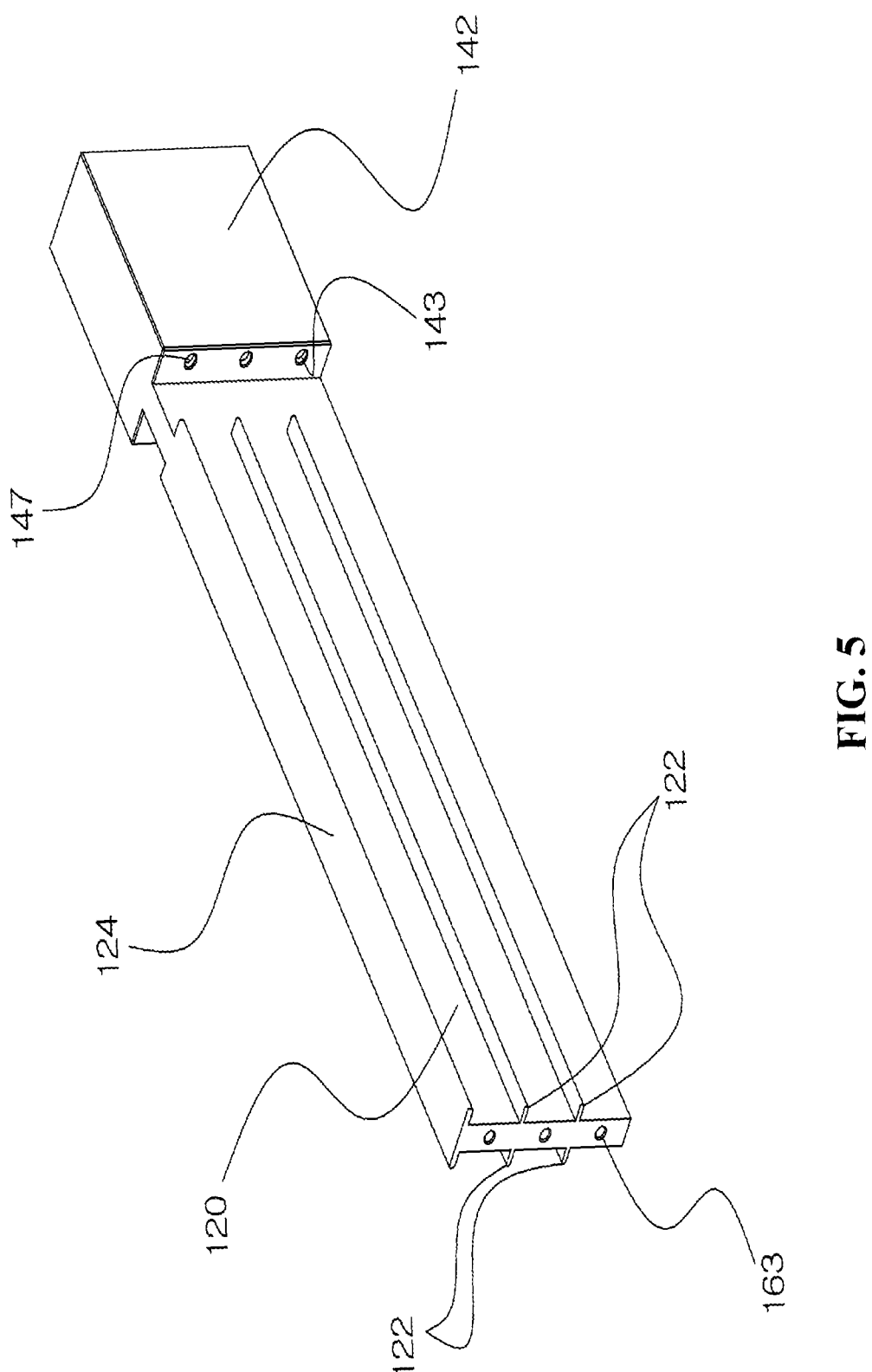
FIG. 5 is a perspective view of the appearance of the holder included in the multi-cassette fiber distribution frame of FIG. 1.
Figure 8:
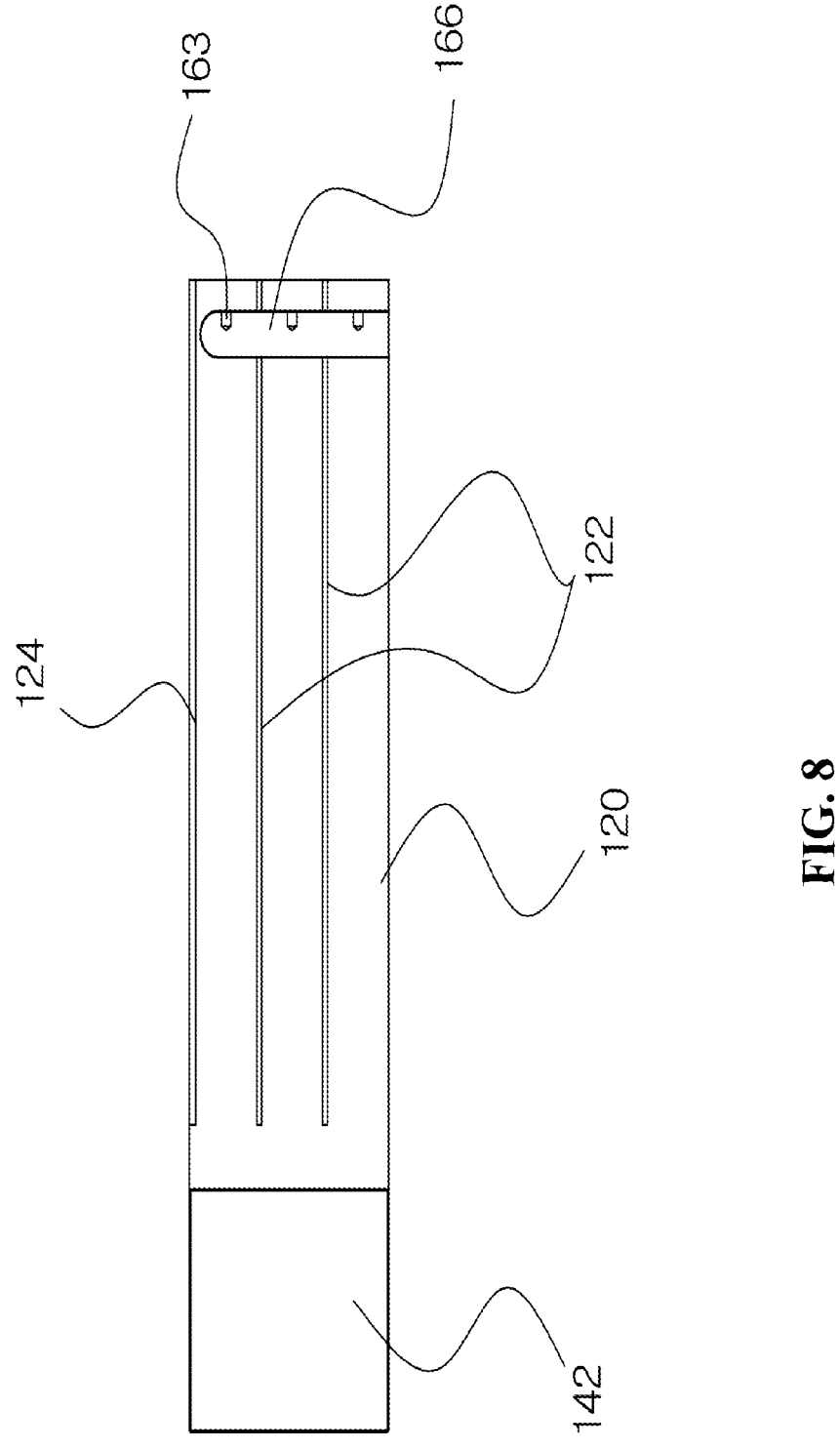
FIG. 8 is a left side view of the holder of FIG. 5.
Figure 9:
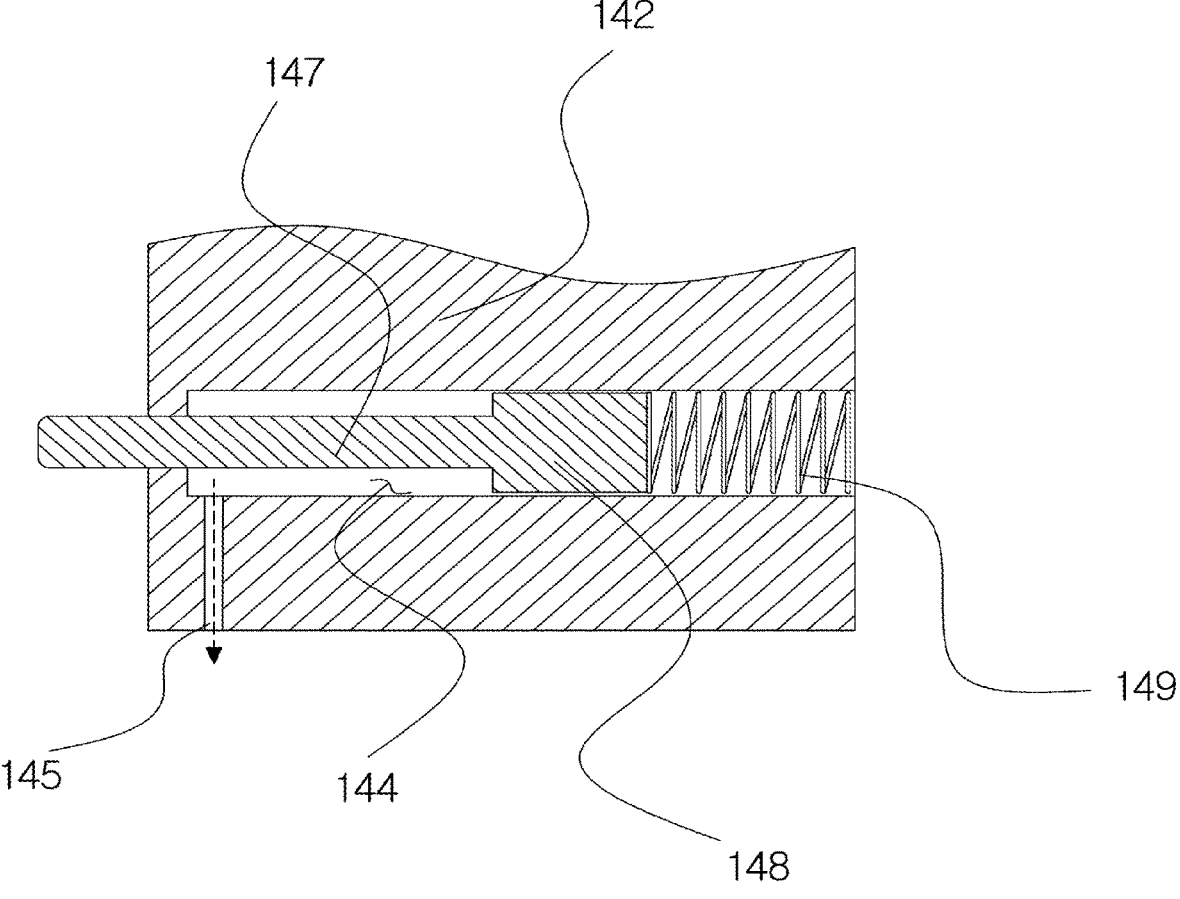
FIG. 9 is a cross-sectional view illustrating another embodiment of the holder of FIG. 5.

As shown in FIGS. 5 and 8, an upper rib 124 of the same shape as the guide rail 122 may be provided on an upper end of the holder 120. The upper rib 124 may prevent separation of the cassette 150 inserted into an uppermost slot 130.

The slot 130 is a space in which the cassette 150 is installed and may be formed by a gap between the holders 120, and an inlet/outlet 132 facing the front surface of the frame 110 may be provided.

The slot 130 may be determined by two adjacent holders 120, and either the guide rails 122 formed on the two adjacent holders 120 at the same height or the upper rib 124. That is, one slot 130 may be formed between guide rails 122.

In an embodiment of the present invention shown in FIGS. 3 and 4, a total of eighteen slots 130 may be formed from a combination of seven holders 120, two-layer guide rails 122 on the seven holders 120, and one upper rib 124, but embodiments are not limited thereto.

The pop-up part 140 is a device provided on the holder 120 and configured to be elastically restored toward the inlet/outlet 132, and may apply elastic pressure to the cassette 150 inserted into the slot 130 toward the inlet/outlet 132 of the slot 130.

To this end, in an embodiment shown in FIGS. 5 to 8, the pop-up part 140 may include a push shaft 147 to move backward or forward on the rear end of the holder 120, an elastic member 149 provided in the holder 120 to elastically press the push shaft 147 toward the inlet/outlet 132, and a housing 142 in which the push shaft 147 and the elastic member 149 are accommodated.

Here, the housing 142 may be integrally formed with the rear end of the holder 120 as shown in FIGS. 5 to 8, but is not limited thereto and may be provided in a rear cover 116 of the frame 110. However, as will be described below, each pop-up part 140 is preferably provided to at least correspond to one of the slots 130 and thus it may be more advantageous to integrally form the housing 142 with the rear end of the holder 120 to be easily aligned with the slots 130 in terms of the easiness of design.

Meanwhile, a space for accommodating the push shaft 147 and the elastic member 149 is provided in the housing 142, and an opening 143 from which a portion of the push shaft 147 protrudes may be provided in the front surface of the housing 142. Through the opening 143, the portion of the push shaft 147 protrudes from the front surface of the housing 142 to apply a pushing force to the cassettes 150.

In an embodiment, the elastic member 149 may be embodied as a compression coil spring, one end of which is supported on the housing 142 and the other end of which is supported on the rear end of the push shaft 147, but is not limited thereto and may be embodied as any other device capable of applying elastic pressure to the push shaft 147 in a forward direction.

In an embodiment, at least one pop-up part 140 may be provided for the slot 130.

Preferably, as shown in FIGS. 3 and 4, the pop-up parts 140 may be provided on opposite surfaces of two adjacent holders 120 to be symmetrical with each other. That is, two pop-up parts 140 may be provided on opposite sides of one slot 130 to be symmetrical with each other.

When two pop-up parts 140 are provided on opposite sides of one slot 130, the pop-up parts 140 may simultaneously apply substantially the same pushing forces to both sides of the rear end of the cassette 150, and thus a force may be prevented from being concentrated on a side of the cassette 150 in a direction in which the cassette 150 is withdrawn from the slot 130, thereby preventing the cassette 150 from being deflected to one side and caught in the slot 130.

The pop-up part 140 pushes the cassette 150 in the direction in which the cassette 150 is withdrawn from the slot 130 to cause the cassette 150 to protrude independently when the suppression of the movement of the cassette 150 by the suppressor 160, which will be described below, is canceled.

Thus, a desired cassette 150 may be easily extracted even in a narrow space by a worker. In particular, it is possible to very easily extract an intermediate cassette 150 from among the densely stacked cassettes 150.

In addition, in the multi-cassette fiber distribution frame 100 according to an embodiment of the present invention, it is possible for the pop-up part 140 to cause a cassette 150 to pop up from among the cassettes 150 so that the cassette 150 may be easily extracted, and thus gaps between the cassettes 150 may be set to be very small, thereby reducing a total size of the fiber distribution frame. Furthermore, it is possible to design a fiber distribution frame so that a larger number of cassettes 150 may be installed therein.

FIG. 9 is a cross-sectional view of another embodiment of the pop-up part 140.

Referring to FIG. 9, in the pop-up part 140, a push shaft 147 may be formed in a cylindrical shape, a sealing member 148 may be provided along the outside of the push shaft 147, the push shaft 147 may be accommodated in a housing 142, and a cylinder 144 may be provided in airtight contact with the sealing member 148.

In the housing 142 of the pop-up part 140, an orifice 145 which allows fluid communication between the inside of the cylinder 144 and the outside of the housing 142 may be provided between the sealing member 148 and an opening 143. Here, the orifice 145 is an air hole with a small diameter and reduces a flow rate at which air inside the cylinder 144 between the sealing member 148 and the opening 143 is discharged to the outside of the housing 142.

In the pop-up part 140 having the above configuration according to the other example, when a force is applied to the push shaft 147 by an elastic member 149, the pressure of the air inside the cylinder 144 resists the elastic pressure of the elastic member 149 while a small amount of air is vented through the orifice 145, thereby reducing a moving speed of the push shaft 147.

Therefore, the pop-up part 140 of the other embodiment may reduce impact applied to the cassettes 150 due to the elastic pressure of the elastic member 149 and prevent the cassette 150 from being completely separated from the slot 130 due to strong elastic pressure.

The cassette 150 is a module including a plurality of optical cable connection terminals on a front surface thereof and inserted into the slot 130.

The suppressor 160 may be provided on the cassette 150 and the holder 120 to resist elastic pressure applied by the pop-up part 140, thereby suppressing movement of the cassette 150 inserted into the slot 130. That is, the suppressor 160 is configured to fix a position of the cassette 150 to maintain a state in which the cassette 150 is inserted into the slot 130.

In addition, the suppressor 160 is configured such that the suppression of the movement of the cassette 150 thereby may be canceled by an operator.

FIGS. 10 to 13 illustrate various examples of the suppressor 160.

Figure 10:
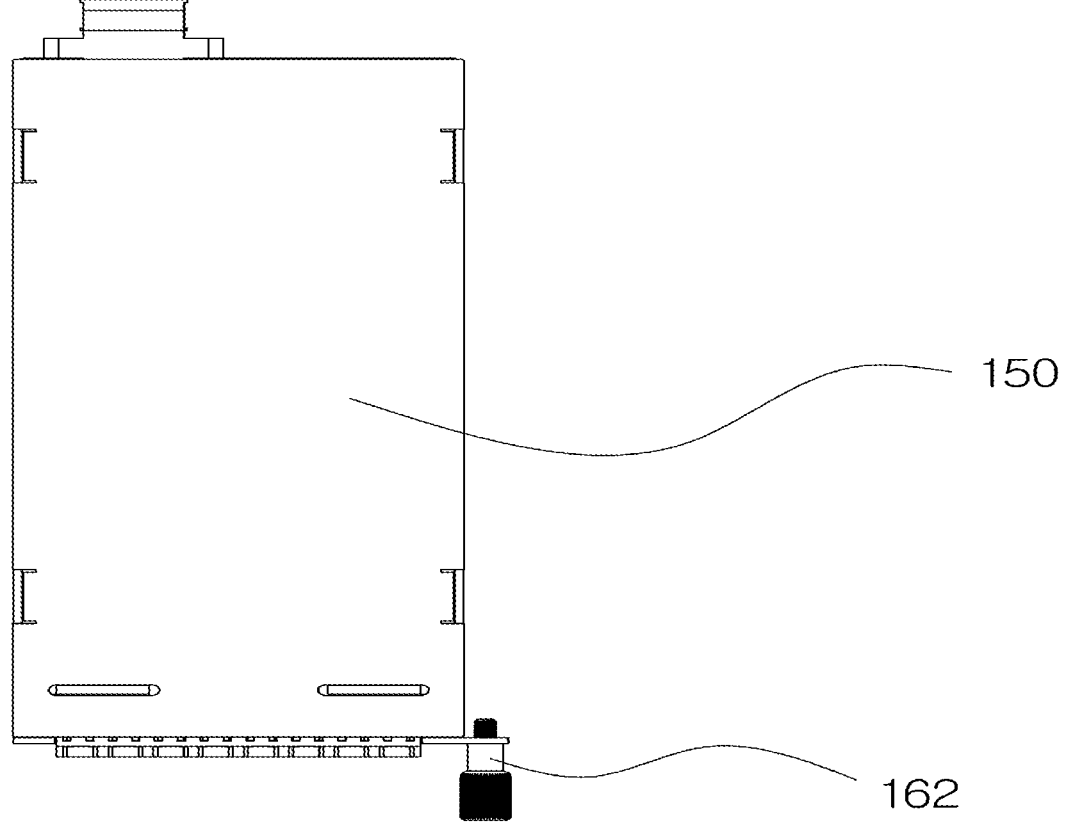
FIG. 10 is a plan view of a cassette included in a multi-cassette fiber distribution frame according to a first embodiment of the present invention.
Figure 11:
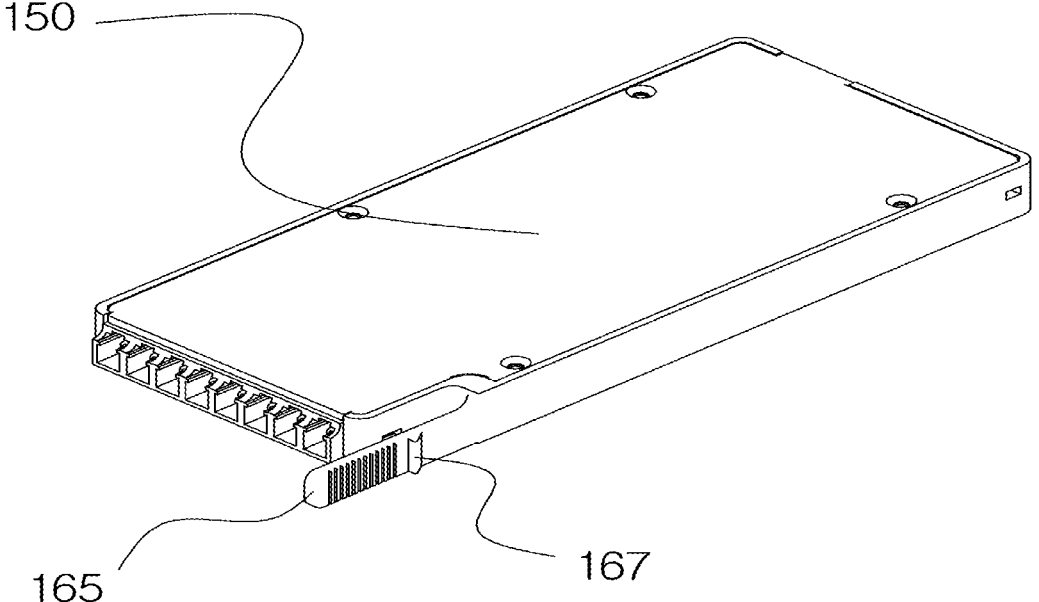
FIG. 11 is a plan view of a cassette included in a multi-cassette fiber distribution frame according to a second embodiment of the present invention.
Figure 12:
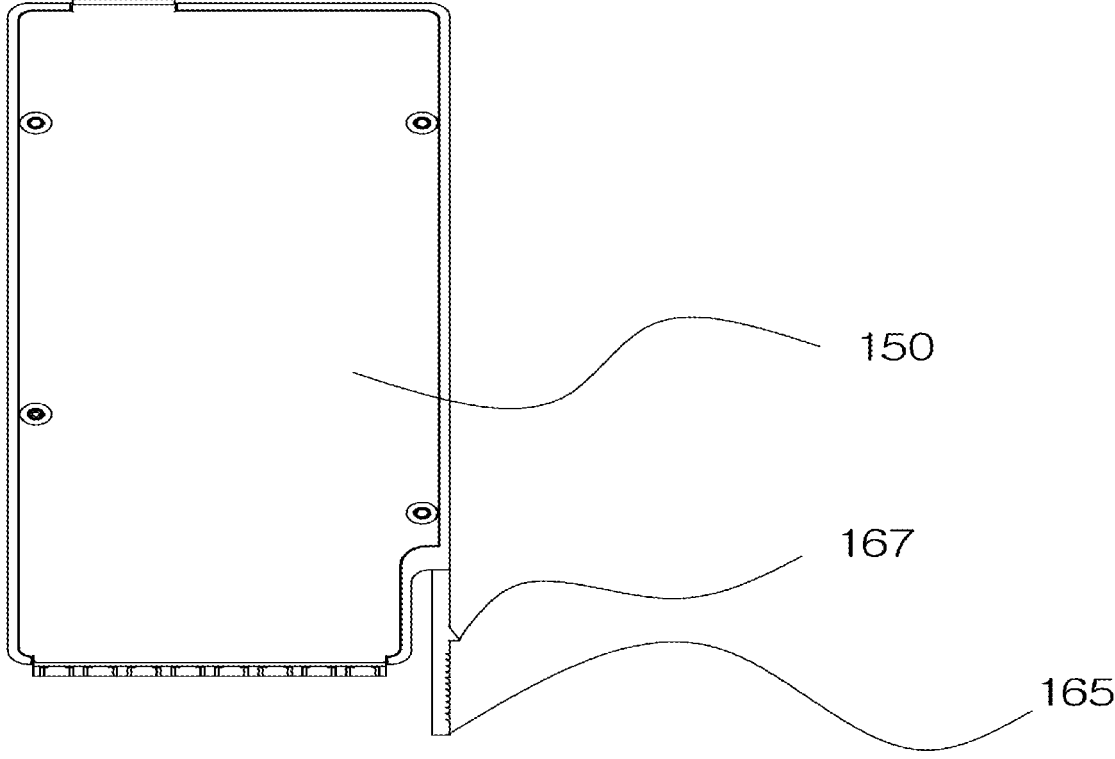
FIG. 12 is a plan view of the cassette according to the second embodiment shown in FIG. 11.
Figure 13:
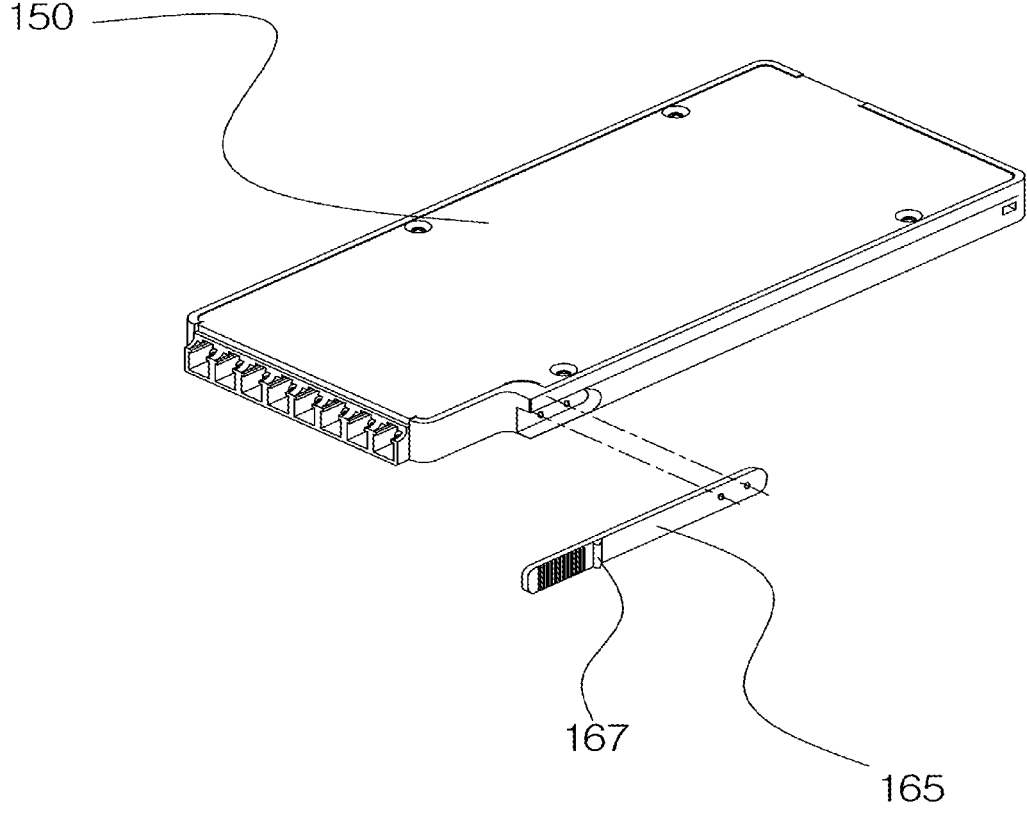
FIG. 13 is a plan view of a cassette included in a multi-cassette fiber distribution frame according to a third embodiment of the present invention.

FIG. 10 is a plan view of a cassette 150, in which a suppressor 160 according to a first embodiment is shown. FIGS. 11 and 12 are a perspective view and a plan view of a cassette 150, in which a suppressor 160 according to a second embodiment is shown. FIG. 13 is a plan view of a cassette 150, in which a suppressor 160 according to a third embodiment is shown.

First Embodiment

First, referring to FIG. 10, the suppressor 160 of the first embodiment may include a bolt hole 163 formed in a front surface of the holder 120, and a screw 162 provided on a front end of the cassette 150 and bolt-coupled to the bolt hole 163 in the holder 120. Here, the bolt hole 163 formed in the front surface of the holder 120 is illustrated in FIG. 4.

In the suppressor 160 of the first embodiment, the screw 162 on the front end of the cassette 150 is bolt-coupled to the bolt hole 163 in the front end of the holder 120, so that the insertion of the cassette 150 into the slot 130 may be maintained against elastic pressure applied by the pop-up part 140.

In the perspective view of the multi-cassette fiber distribution frame 100 according to the embodiment of the present invention shown in FIG. 1, an example in which the suppressor 160 of the first embodiment is applied to nine cassettes 150 mounted in three left columns is illustrated.

The suppressor 160 of the first embodiment is inconvenient because bolt coupling should be canceled when the cassette 150 is mounted or extracted but is advantageous in that inadvertent separation of the cassette 150 from the slot 130 due to an external environmental factor or an operator's mistake can be reduced.

Second Embodiment

Referring to FIGS. 11 and 12, the suppressor 160 of the second embodiment may include a stopping groove 166 formed in the holder 120, and a lever 165 formed on the cassette 150 and provided with a bump 167.

Figure 6:
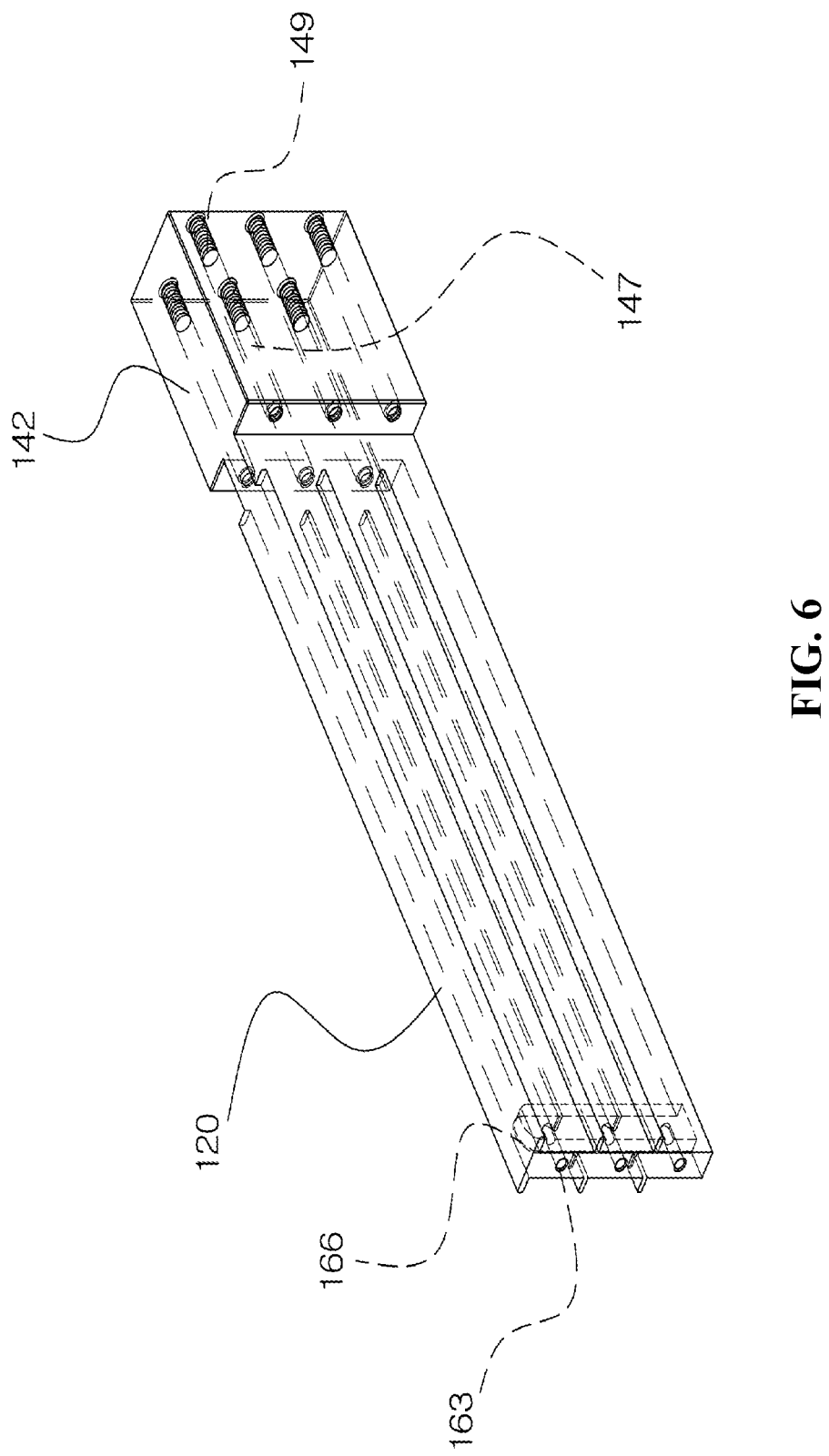
FIG. 6 is a projected perspective view of an internal structure of the holder of FIG. 5.
Figure 7:
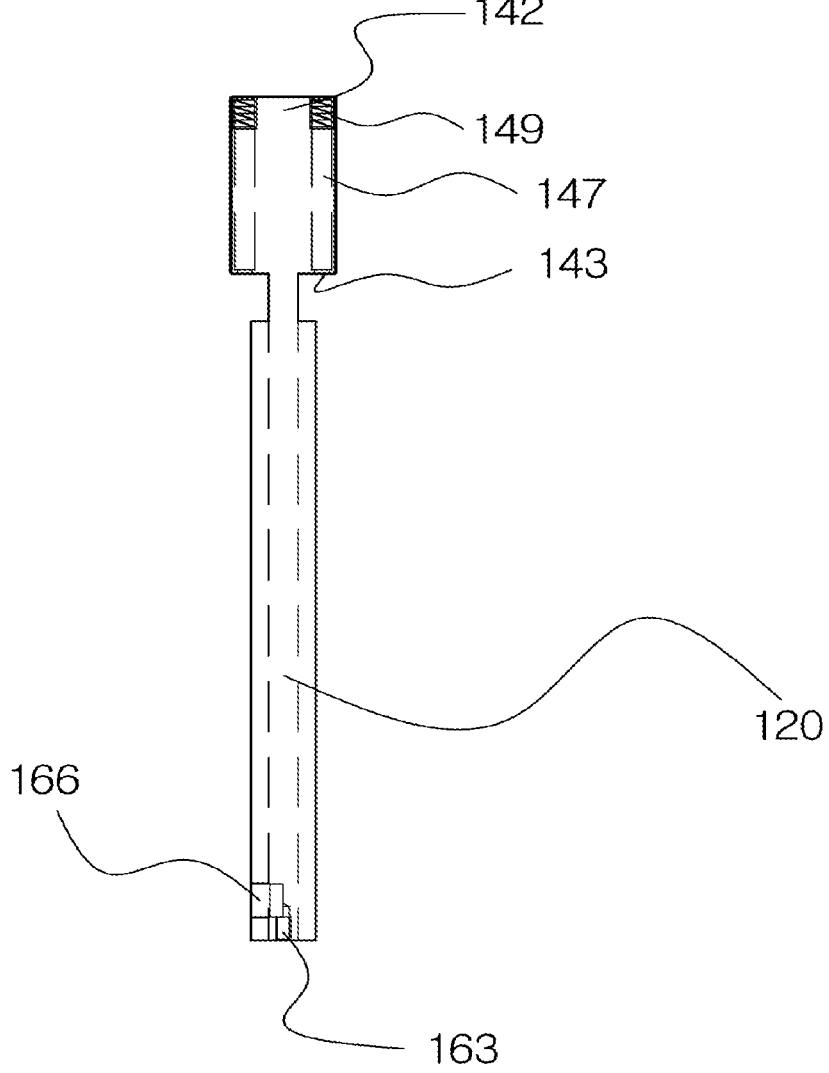
FIG. 7 is a plan view of the holder of FIG. 5.

Here, the stopping groove 166 formed in the holder 120 is illustrated in FIGS. 6, 7, and 8.

The bump 167 on the lever 165 is caught in a ratchet form in the stopping groove 166 to resist elastic pressure applied by the pop-up part 140, thereby fixing a position of the cassette 150.

In an embodiment, the lever 165 may extend from the front surface of the cassette 150. Due to the above structure, even when the cassette 150 is inserted into the slot 130, the front end of the lever 165 may protrude from the front surface of the cassette 150.

In addition, the lever 165 may be bent by an external force by a length of the bump 167 separated from the stopping groove 166 because a rear end thereof is coupled in the form of a cantilever to the body of the cassette 150, and has elastic restorability to return to an original position when the external force is removed.

The lever 165 of the suppressor 160 according to the second embodiment is integrally formed with the cassette 150.

In addition, in the second embodiment, the lever 165 may be provided with a concavo-convex surface to prevent slipping when a worker grips the lever 165 with his or her finger to withdraw the cassette 150.

In the perspective view of the multi-cassette fiber distribution frame 100 according to the embodiment of the present invention shown in FIG. 1, an example in which the suppressor 160 of the second embodiment is applied to three cassettes 150 mounted in a fourth column from the left is illustrated.

The suppressor 160 according to the second embodiment may be operated by simply pushing the cassette 150 because the bump 167 is automatically caught in the stopping groove 166 due to the elastic restorability of the lever 165 when the cassette 150 is inserted into the slot 130, and the operation of the suppressor 160 may be canceled by simply bending the lever 165 in a lateral direction when the cassette 150 is withdrawn from the slot 130, thereby making it more convenient for a worker.

Third Embodiment

Referring to FIG. 13, the suppressor 160 according to the third embodiment includes a lever 165, a bump 167 and a stopping groove 166 of the holder 120 similar to the suppressor 160 according to the second embodiment shown in FIGS. 11 and 12 but is different from the suppressor 160 of the second embodiment in that the lever 165 is detachably assembled to the cassette 150.

Therefore, the suppressor 160 according to the third embodiment may include a coupling portion through which the lever 165 may be coupled to the cassette 150, and the lever 165 may be coupled to a coupling portion of the cassette 150 through a bolt or in a wedge structure.

The suppressor 160 according to the third embodiment is advantageous in that the lever 165 to which a deformation load is repeatedly applied may be formed of a more durable material that withstands a load unlike the cassette 150 and is easily replaced with another lever 165 of a different length or shape according to an environment in which the cassette 150 is installed.

The lever 165 may be replaced with a bracket (not shown) with the screw 162 to implement the configuration of the suppressor 160 of the first embodiment.

In the perspective view of the multi-cassette fiber distribution frame 100 according to the embodiment of the present invention shown in FIG. 1, an example in which the suppressor 160 of the third embodiment is applied to six cassettes 150 mounted in two columns from the right is illustrated.

According to an embodiment of the present invention configured as described above, it is possible to achieve an effect of improving the convenience of replacing or assembling/disassembling cassettes through a multi-cassette fiber distribution frame.

While the present invention has been illustrated and described with respect to specific embodiments, various modifications and changes may be made by those of ordinary skill in the art without departing from the spirit and scope of the present invention defined in the following claims.

What is claimed is:

1. A multi-cassette fiber distribution frame comprising:
a frame whose front surface is open;
a plurality of holders provided on the frame at intervals;
a plurality of slots formed by the intervals and each including an inlet and outlet facing the front surface of the frame; and
pop-up parts provided on the plurality of holders and configured to be elastically restored toward the inlet and outlet,
wherein the plurality of holders have a plate shape extending from the front surface of the frame toward a rear surface of the frame, and comprise a plurality of guide rails protruding from a surface of the holder facing another holder adjacent to the holder and extending from the front surface of the frame to the rear surface of the frame, and
one slot among the plurality of slots is provided between the plurality of guide rails,
wherein the pop-up parts each comprise:
a push shaft configured to move forward and backward on a rear end of one of the plurality of holders; and
an elastic member provided on one of the plurality of holders and configured to apply elastic pressure to the push shaft toward the inlet and outlet,
wherein the pop-up parts each further comprise a housing for accommodating the push shaft and the elastic member,
wherein the housing is provided with an opening from which a portion of the push shaft protrudes,
wherein the push shaft has a cylindrical shape and comprises a sealing member along an outer circumference thereof,
a cylinder configured to accommodate the push shaft therein and be in airtight contact with the sealing member is provided in the housing, and
the housing is provided with an orifice located between the sealing member and the opening and configured for fluid communication between inside of the cylinder and outside of the housing.

2. The multi-cassette fiber distribution frame of claim 1, wherein at least one of the pop-up parts is provided for each of the plurality of slots.

3. The multi-cassette fiber distribution frame of claim 1, wherein the pop-up parts are provided on opposite surfaces of two adjacent holders to be symmetrical with each other.

4. A multi-cassette fiber distribution frame comprising:
a frame whose front surface is open;
a plurality of holders provided on the frame at intervals;
a plurality of slots formed by the intervals and each including an inlet and outlet facing the front surface of the frame; and
pop-up parts provided on the plurality of holders and configured to be elastically restored toward the inlet and outlet, further comprising cassettes including a plurality of optical cable connection terminals on front surfaces thereof and configured to be inserted into the plurality of slots, and wherein the pop-up parts apply elastic pressure on the cassettes inserted into the plurality of slots toward the inlet and outlet, and the multi-cassette fiber distribution frame further comprises suppressors provided on the cassettes and the plurality of holders and configured to resist elastic pressure applied by the pop-up parts to suppress movement of the cassettes inserted into the plurality of slots, wherein the suppressors each comprise:

a bolt hole formed in a front surface of one of the plurality of holders; and a screw provided on a front end of one of the cassettes and coupled to the bolt hole through a bolt.

5. A multi-cassette fiber distribution frame comprising:

a frame whose front surface is open;

a plurality of holders provided on the frame at intervals;

a plurality of slots formed by the intervals and each including an inlet and outlet facing the front surface of the frame; and pop-up parts provided on the plurality of holders and configured to be elastically restored toward the inlet and outlet, further comprising cassettes including a plurality of optical cable connection terminals on front surfaces thereof and configured to be inserted into the plurality of slots, and wherein the pop-up parts apply elastic pressure on the cassettes inserted into the plurality of slots toward the inlet and outlet, and the multi-cassette fiber distribution frame further comprises suppressors provided on the cassettes and the plurality of holders and configured to resist elastic pressure applied by the pop-up parts to suppress movement of the cassettes inserted into the plurality of slots, wherein the suppressors each comprise:

a stopping groove formed in one of the plurality of holders; and a lever provided on one of the cassettes and provided with a bump to be caught in the stopping groove, wherein a portion of the lever extends from the front surface of the cassette.

6. The multi-cassette fiber distribution frame of claim 5, wherein the lever is detachably assembled to the cassette.

* * * * *